United States Patent
Tatsumi et al.

(10) Patent No.: US 9,669,604 B2
(45) Date of Patent: Jun. 6, 2017

(54) ALUMINUM-ALLOY PLATE AND JOINED BODY AS WELL AS AUTOMOBILE MEMBER USING THE SAME

(71) Applicant: KOBE STEEL, LTD., Kobe-shi (JP)

(72) Inventors: Akihiko Tatsumi, Kobe (JP); Satoru Takada, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 36 days.

(21) Appl. No.: 14/419,026

(22) PCT Filed: Sep. 5, 2013

(86) PCT No.: PCT/JP2013/073949
§ 371 (c)(1),
(2) Date: Feb. 2, 2015

(87) PCT Pub. No.: WO2014/045886
PCT Pub. Date: Mar. 27, 2014

(65) Prior Publication Data
US 2015/0231859 A1    Aug. 20, 2015

(30) Foreign Application Priority Data
Sep. 20, 2012 (JP) .................................. 2012-206508

(51) Int. Cl.
*B32B 15/20* (2006.01)
*B32B 15/04* (2006.01)
(Continued)

(52) U.S. Cl.
CPC .............. *B32B 15/043* (2013.01); *B32B 7/12* (2013.01); *B32B 15/20* (2013.01); *C22C 21/06* (2013.01);
(Continued)

(58) Field of Classification Search
None
See application file for complete search history.

(56) References Cited

U.S. PATENT DOCUMENTS 5,463,804 A * 11/1995 McCleary ................. C09J 5/02
29/469.5

FOREIGN PATENT DOCUMENTS

CN        102312233 A    1/2012
EP        0557531 A1     9/1992
(Continued)

OTHER PUBLICATIONS

International Search Report and Written Opinion of the International Searching Authority issued Nov. 19, 2013 in PCT/JP2013/073949 filed Sep. 5, 2013.

*Primary Examiner* — Daniel J Schleis
(74) *Attorney, Agent, or Firm* — Oblon, McClelland, Maier & Neustadt, L.L.P.

(57) ABSTRACT

An aluminum-alloy plate (10) equipped with an aluminum-alloy substrate (1) and an aluminum-oxide film (2) formed on the surface of the aluminum-alloy substrate (1), wherein: the aluminum-oxide film (2) contains at least one type of additional element having a P-B ratio of 1.00 or more, zirconium in the amount of 0.01-10 atomic percent, and magnesium in the amount of 0.1 or more and less than 10 atomic percent; and the total amount of additional elements contained in the aluminum-oxide film (2) is 0.010-5.0 atomic percent. As a result, it is possible to provide: an aluminum-alloy plate which exhibits excellent post-degreasing-water-wettability stability even when in a high-temperature, high-humidity environment; and a joined body and a vehicle member which use the same.

12 Claims, 4 Drawing Sheets

(51) Int. Cl.
*B32B 7/12* (2006.01)
*C22C 21/06* (2006.01)
*C23C 30/00* (2006.01)

(52) U.S. Cl.
CPC .......... *C23C 30/00* (2013.01); *B32B 2255/06* (2013.01); *B32B 2255/20* (2013.01); *B32B 2311/24* (2013.01); *B32B 2605/08* (2013.01)

(56) References Cited

FOREIGN PATENT DOCUMENTS

| | | |
|---|---|---|
| JP | 62-95396 | 5/1987 |
| JP | 02-115385 | 4/1990 |
| JP | 3-106993 | 5/1991 |
| JP | 04-214835 | 8/1992 |
| JP | 06-256881 | 9/1994 |
| JP | 06-256980 | 9/1994 |
| JP | 2744697 B | 4/1998 |
| JP | 11-36082 A | 2/1999 |
| JP | 2006-183065 A | 7/2006 |
| JP | 2006-200007 A | 8/2006 |
| JP | 2007-84663 | 4/2007 |
| JP | 2007-217750 | 8/2007 |
| JP | 2011-68930 A | 4/2011 |
| JP | 2012-031479 A | 2/2012 |
| JP | 2012031479 * | 2/2012 |
| JP | 2013-166975 A | 8/2013 |

\* cited by examiner

ALUMINUM-ALLOY PLATE AND JOINED BODY AS WELL AS AUTOMOBILE MEMBER USING THE SAME

TECHNICAL FIELD

The invention relates to an aluminum-alloy plate for use in vehicles including an automobile, a ship, and an aircraft, and in particular, to an aluminum-alloy plate which can be suitably used as an automobile panel, and a joined body as well as an automobile member, using the same.

BACKGROUND ART

A variety of aluminum-alloy plates have been conventionally in use for general purposes as vehicle members of an automobile, a ship, and an aircraft, respectively, in accordance to each property thereof on an alloy-by-alloy basis. In particular, enhancement in fuel economy, through reduction in weight of the vehicle member, is required of the aluminum-alloy plate due to public awareness of recent geoenvironmental issues such as $CO_2$ emission, etc., and there has been an increase in the use of an aluminum-alloy plate whose specific gravity is about one third as compared with iron, while having excellent energy-absorption properties.

Further, in the case of using aluminum alloy as an automobile panel, characteristics of the aluminum alloy, such as formability, weldability, adhesiveness, chemical-conversion properties, corrosion resistance after coating, and attractive appearance, etc., are required. A method of manufacturing an automobile panel with the use of an aluminum alloy includes the steps of 1) forming (cutting into a predetermined size, and press-forming into a predetermined shape, 2) bonding (welding and/or adhesion, 3) chemical-conversion coating (degreasing by use of a cleaning agent→surface adjustment by use of colloidal titanate, etc.→zinc phosphate treatment, and 4) coating (priming through electrodeposition coating→intercoating→finish coating). The method described as above is fundamentally the same as the method adopted in the case of using a conventional steel plate.

Meanwhile, as progress is being made in the trend of automobile parts being assembled into a module, and there has been a tendency that a time interval between the manufacturing of an aluminum alloy plate itself and the automobile panel entering into a body-manufacturing process becomes longer. The trend of automobile parts being assembled into the module is represents a method whereby individual parts fitted to a body directly by an automobile manufacturer are sub-assembled by a parts-supply company in advance before fitted to the body. It is a main object of this method to simplify hard works performed at the automobile manufacturer in the past to thereby improve production efficiency. The method also has favorable effects of shortening a production process, and reduction in work-in-process. Although a burden on the part of the parts-supply company will increase, this method is effective in cost reduction for the automobile manufacturer and the parts-supply company as a whole to thereby contribute to reduction in the production cost of an automobile.

Further, a system of direct delivery from a light-pressure maker (a rolled-product maker) to the automobile manufacturer has thus far been in the mainstream of a transfer channel of an automotive aluminum-alloy plate. However, as further progress is made in the trend of automobile parts being assembled into the module, the transfer channel is inevitably altered to one via the parts-supply company, so that the time interval between the manufacturing of the aluminum alloy plate itself and the automobile parts entering into the body-manufacturing process becomes unavoidably rendered longer than before.

In such a case, however, the surface properties of an automotive aluminum-alloy plate will undergo aged deterioration to adversely affect adhesiveness, chemical-conversion properties, and coating properties, thereby posing a problem. It is known that at the time of chemical-conversion accompanying the aged deterioration, in particular, stability in wettability after degreasing will deteriorate, and a chemical-conversion coating film is rendered hard to adhere, so that corrosion resistance is affected thereby.

For this reason, efforts have thus far been focused on enhancement in the chemical-conversion properties, etc. by removal of magnesium (magnesium is also referred to as "Mg" hereinafter) in the surface of an aluminum-alloy containing magnesium (refer to Patent Documents 1 through 4).

Further, in order to obtain an aluminum-alloy plate excellent in both wettability after degreasing, and adhesiveness, in particular, there has been proposed an aluminum-alloy plate for use as the body sheet of an automobile (refer to Patent Documents 5 and 6), obtained by pouring a pH-adjusted hot water at a temperature 40° C. or higher after annealing to thereby adjust both Mg content and OH content or both Mg content and Si content of the surface film of the aluminum-alloy plate before applying a rust-prevention oil thereto within 14 days after surface adjustment (refer to Patent documents 5, 6).

Still further, in order to obtain an aluminum-alloy plate less in aged deterioration of the characteristics thereof, there has been proposed an aluminum-alloy plate for use in an automobile body, the aluminum-alloy plate being equipped with a metallic aluminum substrate of an aluminum-alloy plate containing 2 to 10 wt % of Mg, a phosphate film of aluminum, formed on the substrate, and an aluminum oxide film formed on the phosphate film (refer to Patent document 7).

Furthermore, in order to obtain an aluminum-alloy plate excellent in degreasing properties, chemical-conversion properties, and adhesiveness, there has been proposed a surface treated aluminum-alloy plate equipped with a film formed on the surface thereof, the film containing a predetermined content of Mg, and Zr, respectively, while containing neither halogen nor phosphorus (refer to Patent document 8).

CITATION LIST

Patent Literature

Patent Document 1: Japanese Unexamined Patent Application Publication No. Hei 06 (1994)-256980
Patent Document 2: Japanese Unexamined Patent Application Publication No. Hei 06 (1994)-256881
Patent Document 3: Japanese Unexamined Patent Application Publication No. Hei 04 (1992)-214835
Patent Document 4: Japanese Unexamined Patent Application Publication No. Hei 02 (1990)-115385
Patent Document 5: Japanese Unexamined Patent Application Publication No. 2006-200007
Patent Document 6: Japanese Unexamined Patent Application Publication No. 2007-217750

Patent Document 7: Japanese Patent No. 2744697 Patent Document 8: Japanese Unexamined Patent Application Publication No. 2012-31479

SUMMARY OF INVENTION

Technical Problem

In the case of Patent Documents 1 through 4, described as above, the removal of magnesium in the surface of the aluminum-alloy after cold rolling is not only required, but also it is impossible to obtain surface stability with less aged deterioration in respect to surface properties in a high-temperature and humid environment, that is, surface stability excellent in stability in wettability after degreasing in a high-temperature and humid environment through the removal of magnesium alone.

Further, the surface stability with less aged deterioration in the high-temperature and humid environment, that is, one having the surface stability excellent in stability in wettability after the degreasing in the high-temperature and humid environment cannot be obtained by simply applying the rust-prevention oil to the surface within 14 days after the surface adjustment to thereby protect the surface, as in the respective cases of Patent Documents 5, 6, described as above.

Still further, with Patent Document 7 described as above, at the time of carrying out the example of the invention, comparative evaluation is made with the use of the material of a sample left out for one week after preparation of the sample, as a reference. However, the aged deterioration of the surface properties of the aluminum-alloy plate is the largest in deterioration amount up to about one week immediately after the sample is prepared, and aged deterioration thereafter is relatively small. Accordingly, the stability of the surface properties in the high-temperature and humid environment, that is, the stability in wettability after the degreasing, in the high-temperature and humid environment, cannot be ensured simply on the basis of evaluation results on the material left out for one week, as shown in Patent Document 7.

Deterioration in the stability in wettability after the degreasing is regarded attributable to an organic matter contained in the rust-prevention oil and a press-oil, respectively, and an ambient organic matter adsorbed in storage, which remain in the surface even after the degreasing. When 5000 series Al—Mg alloys, and 6000 series Al—Mg—Si alloys, for use in an automotive aluminum panel, etc., are exposed to a high temperature in the manufacturing process thereof, Mg undergoes diffusion-oxidation in the surface thereof. As Mg oxide is smaller in molar volume than metal Mg, an aluminum alloy containing Mg is considered to have an oxidized film having a pore on the surface thereof as compared with an aluminum alloy without Mg contained therein. It is difficult to sufficiently remove an organic component (an oil component such as ester, etc., in particular) adsorbed to the pore through normal alkaline degreasing, and an aluminum-alloy plate covered with an oxidized film having pores on the surface thereof will undergo gradual deterioration in the stability in wettability after the degreasing owing to an organic matter adsorbed during storage, thereby posing the risk of occurrence of aged deterioration. Further, because a large number of the aluminum-alloy plates are successively degreased in a manufacturing process at the automobile manufacturer, there is the risk that a degreasing liquid will undergo deterioration in alkalinity as compared with the state of a new degreasing liquid immediately after the initial make-up of an electrolytic bath, resulting in deterioration of degreasing capacity, which also fosters aged deterioration in the stability in wettability after the degreasing in the high-temperature and humid environment.

Yet further, in the case of Patent Document 8, since the film contains Ca as an impurity, pores are formed in the film, and the aluminum-alloy plate undergoes gradual deterioration in wettability after degreasing, owing to an organic matter adsorbed during storage in a high-temperature and humid environment, thereby posing the risk of occurrence of aged deterioration.

The invention has been developed to solve the problems described as above, and it is therefore an object of the invention to provide an aluminum-alloy plate having excellent stability in wettability after degreasing even if stored in a high-temperature and humid environment for a long-time period after an oil is applied thereto, and a joined body as well as an automotive member, using the same.

Solution to Problem

In order to solve the problems described as above, according to one aspect of the invention, there is provided an aluminum-alloy plate provided with an aluminum-alloy substrate, and an aluminum oxide film formed on the surface of the aluminum-alloy substrate, the aluminum oxide film containing at least one species of an addition element not less than 1.00 in P-B ratio (Pilling-Bedworth ratio), 0.01 to 10 atomic % of zirconium, and not less than 0.1 to less than 10 atomic % of magnesium. The total contained amount of the addition element is in a range of 0.010 to 5.0 atomic %.

With such a makeup of the aluminum-alloy plate, described as above, because the aluminum oxide film contains a predetermined content of zirconium, oxidation of the aluminum oxide film, in a humid environment, can be suppressed for a long time-period. By so doing, surface stability for a long time-period is obtained, and stability in wettability after degreasing can be maintained even after stored for a long time-period. Furthermore, because the aluminum oxide film contains a predetermined content of magnesium, and an addition element not less than 1.00 in P-B ratio, a pore is not formed on the aluminum oxide film to thereby render a microstructure more compact. For this reason, an organic component (an oil component such as ester, etc., in particular) is easily removed in a degreasing process without being taken into the aluminum oxide film. As a result, it is possible to suppress deterioration in stability in wettability after degreasing even after stored for a long time-period.

The aluminum-alloy plate according to the invention is preferably further provided with a bonding layer made of a bonding agent, formed on the surface of the aluminum oxide film.

With such a makeup of the aluminum-alloy plate, described as above, since the aluminum-alloy plate is equipped with the bonding layer beforehand, it is possible to omit a formation work for forming a bonding member on the surface of the aluminum-alloy plate at the time of manufacturing a joined body or an automotive member, using the aluminum-alloy plate.

With the aluminum-alloy plate according to the invention, the aluminum-alloy substrate is preferably made of Al—Mg based alloy, Al—Cu—Mg based alloy, Al—Mg—Si based alloy, or Al—Zn—Mg based alloy.

With such a makeup as described above, because the aluminum-alloy substrate is made of a predetermined aluminum alloy, the strength of the substrate is improved. Further, because the magnesium content of the aluminum oxide film is controlled so as to fall in a predetermined range, the stability in wettability after degreasing is enhanced even if the aluminum-alloy substrate is made of an alloy species relatively high in magnesium content.

A joined body according to the invention is provided with aluminum-alloy plates, neither thereof being equipped with a bonding layer, the aluminum-alloy plates being joined to each other through the intermediary of the bonding member made of a bonding agent. The bonding member is bonded to respective portions of two of the aluminum-alloy plates, adjacent to the aluminum oxide film, and the respective aluminum oxide films of two of the aluminum-alloy plates are disposed so as to oppose each other through the intermediary of the bonding member.

A joined body according to the invention is provided with a first aluminum-alloy plate made from the aluminum-alloy plate that is not equipped with the bonding layer, and a second aluminum-alloy plate made of aluminum alloy, the second aluminum-alloy plate being joined to the first aluminum-alloy plate through the intermediary of a bonding member made of a bonding agent. The bonding member is bonded to a portion of the first aluminum-alloy plate, adjacent to the aluminum oxide film.

A joined body according to the invention is a joined body in which the aluminum-alloy plate that is not equipped with a bonding layer is joined to a portion of the aluminum-alloy plate equipped with the bonding layer, adjacent to the bonding layer, through the intermediary of the bonding member. Respective aluminum oxide films of two of the aluminum-alloy plates are disposed so as to oppose each other through the intermediary of the bonding layer.

Further, a joined body according to the invention is a joined body in which a second aluminum-alloy plate made of aluminum alloy is bonded to a first aluminum-alloy plate made from the aluminum-alloy plate equipped with a bonding layer. The second aluminum-alloy plate is joined to a portion of the first aluminum-alloy plate, adjacent to the bonding layer.

With such a makeup described as above, since use is made of the aluminum-alloy plate excellent in respect of stability in wettability after degreasing, deterioration in adhesion strength at an interface between the aluminum oxide film and the bonding member or the bonding layer is suppressed, so that adhesiveness between the aluminum-alloy plates that are joined to each other is easily enhanced, and adhesion durability is improved.

An automotive member according to the invention is manufactured from the joined body described in the foregoing.

With such a makeup described as above, since the automotive member is made from the joined body that has used the aluminum-alloy plate excellent in respect of the stability in wettability after degreasing, adhesiveness between the aluminum-alloy plates that are joined to each other is easily enhanced, and adhesion durability of the automotive member is improved even if the automotive member is exposed to a high-temperature and humid environment.

Advantageous Effects of Invention

The invention provides the aluminum-alloy plate excellent in respect of stability in wettability after degreasing even if exposed to a high-temperature and humid environment. Further, with use of the aluminum-alloy plate described as above, it is possible to provide the joined body and the automotive member with enhanced adhesion durability.

BRIEF DESCRIPTION OF DRAWINGS

FIG. 4(a) is a side view, while FIG. 4(b) being a plan view.

DESCRIPTION OF EMBODIMENTS

<<Aluminum-Alloy Plate>>

Figure 1:
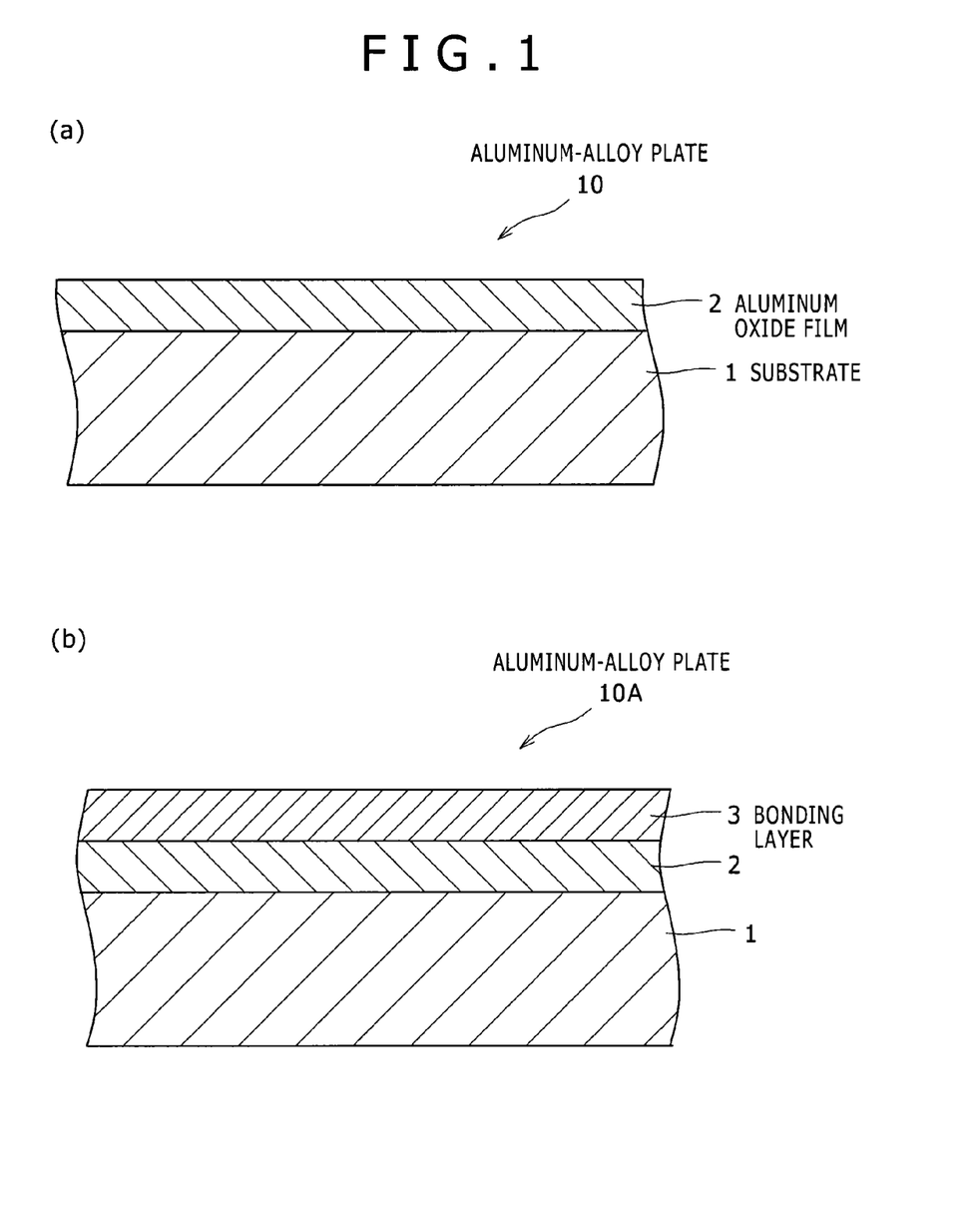
FIGS. 1(a) and 1(b) each are a sectional view schematically showing the makeup of an aluminum-alloy plate according to the invention.

An aluminum-alloy plate according to the invention is specifically described below with reference to FIG. 1(a). As shown in FIG. 1(a), an aluminum-alloy plate 10 is provided with an aluminum-alloy substrate 1 (hereinafter, referred to as "a substrate"), and an aluminum oxide film 2 formed on the surface of the substrate 1. Further, in a production method, the aluminum oxide film 2 is formed by first forming an oxide film, and subsequently, subjecting the oxide film as formed to surface treatment using a finishing liquid containing a predetermined content of zirconium, and an addition element, respectively, thereby forming the aluminum oxide film 2 as a film in which zirconium dioxide and the addition element adhere to, or enter the oxide film, and a magnesium content of the oxide film is controlled, as described later on. Herein, the addition element is an element not less than 1.00 in P-B ratio (Pilling-Bedworth ratio).

Herein, the surface of the substrate 1 is meant by at least one plane of the surface of the substrate 1, including the so-called one surface and both surfaces.

Respective constituents of the aluminum-alloy plate 10 are described below.

<Substrate>

The substrate 1 is made of an aluminum alloy selected as appropriate from among a variety of non-heat-treatable aluminum alloys, or heat-treatable aluminum alloys, specified by JIS, or closely analogous to JIS, according to the application of the aluminum-alloy plate 10. The non-heat-treatable aluminum alloys include pure aluminum (1000 series), Al—Mn based alloy (3000 series), Al—Si based alloy (4000 series), and Al—Mg based alloy (5000 series), whereas the heat-treatable aluminum alloys include Al—Cu—Mg based alloy (2000 series), Al—Mg—Si based alloy (6000 series), and Al—Zn—Mg based alloy (7000 series).

To cite a specific example, in the case where the aluminum-alloy plate 10 is used for an automotive member, a high-strength substrate whose 0.2% yield strength is not less than 100 MPa is preferably used. For aluminum alloy as a constituent of a substrate satisfying such properties as described above, suitable use is made of aluminum alloy as general-purpose alloy that contains relatively much magnesium and is relatively high in yield strength, such as aluminum alloys of 2000 series, 5000 series, 6000 series, and 7000 series, etc., normally in wide-spread use in application for a structural member, the aluminum alloys being tempered as necessary. The 6000 series aluminum alloy is preferably used in that the same is excellent in age hardening ability, relatively low in alloying element content, and excellent in scrap recyclability, and formability, as well.

<Aluminum Oxide Film>

The aluminum oxide film 2 is formed on the surface of the substrate 1 in order to achieve enhancement in stability in wettability after degreasing (hereinafter, referred to as "stability in wettability" as appropriate) even in the case where the aluminum oxide film 2 is exposed to a high-temperature and humid environment, the aluminum oxide film 2 containing a predetermined content of an addition element, zirconium, and magnesium, respectively.

As to formation of the aluminum oxide film 2, in this case, an oxide film is formed on the surface of the substrate 1 by heat treatment in an aluminum-oxide-film forming process S2 (refer to FIG. 2) described later on, and subsequently, surface treatment with the use of a finishing liquid containing a predetermined amount of zirconium and an addition element, respectively, is applied to the surface of the oxide film, thereby forming the aluminum oxide film 2 from a surface-treated oxide film in its entirety. The chemical components of the aluminum oxide film 2 are described below in order of zirconium, magnesium, and an addition element.

(Zirconium)

The aluminum oxide film 2 contains zirconium in a range of 0.01 to 10 atomic %. If the aluminum oxide film 2 is caused to contain zirconium such that the zirconium content of the aluminum oxide film 2 will be in the range of 0.01 to 10 atomic %, oxidation of the aluminum-alloy substrate in a humid environment for a long time-period can be suppressed. By so doing, the surface stability for a long time-period is obtained, and the stability in wettability after degreasing can be maintained even after stored for a long time-period.

If the zirconium content of the aluminum oxide film 2 is less than 0.01 atomic %, advantageous effects will not be obtained, whereas if the zirconium content of the aluminum oxide film 2 exceeds 10 atomic %, the advantageous effects will be saturated. The zirconium content in a range of 0.02 to 8 atomic % is preferable, and the zirconium content in a range of 0.04 to 6 atomic % is more preferable. A method to make zirconium be contained in the aluminum oxide film 2 includes, for example, surface treatment to be applied to the aluminum oxide film 2, by use of an aqueous solution of a zirconium salt, such as zirconium nitrate (formal name: zirconium oxide di-nitrate, conventional name: oxy zirconium nitrate, zirconyl nitrate, zircon nitrate, etc.), zirconium sulfate, and zirconium acetate. Further, in order to adjust the zirconium content of the aluminum oxide film 2, the zirconium content as desired can be obtained by adjustment of treatment time as well as the temperature of the surface treatment, together with the concentration as well as the pH of the finishing liquid, as described later on.

(Magnesium)

The aluminum oxide film 2 contains magnesium in a range of not less than 0.1 to less than 10 atomic %.

Aluminum alloy making up the substrate 1 normally contains magnesium as an alloy constituent. With the aluminum oxide film 2 formed on the surface of the substrate 1, magnesium is present in a concentrated state on the surface of the aluminum oxide film 2, and as magnesium is an element undergoing contraction in volume due to oxidation, a composite oxide of aluminum and magnesium is formed by the agency of oxides on the surface of the substrate 1 in the case where magnesium is contained in aluminum alloy. If a magnesium-component content in the oxide is high, a pore is susceptible to formation on the aluminum oxide film 2. Then, an oil component is taken into the pore, it is hard to remove the oil component in a degreasing process, thereby wettability after degreasing is deteriorated. For this reason, it is necessary to keep a magnesium content in a specified range in order to secure wettability after degreasing after stored for a long time-period.

Accordingly, the magnesium content is adjusted to less than 10 atomic % through the surface treatment of the aluminum oxide film 2, thereby enhancing stability in wettability. The magnesium content is preferably less than 8 atomic %, and more preferably less than 6 atomic %. A lower limit value of the magnesium content is not less than 0.1 atomic % from the viewpoint of cost efficiency, and is preferably not less than 4 atomic %. As an adjustment method for adjusting the magnesium content of the aluminum oxide film 2, surface treatment is applied to the aluminum oxide film 2 with the use of, for example, an acid, such as nitric acid and sulfuric acid, and an aqueous solution of a zirconium salt, etc., and treatment time as well as the temperature of the surface treatment, together with the concentration as well as the pH of the finishing liquid, is adjusted as described later on, thereby enabling the magnesium content as desired to be obtained. In other words, the magnesium content of the aluminum oxide film 2 is adjusted by dissolving magnesium of the aluminum oxide film 2 into the acid and the aqueous solution of the zirconium salt.

(Addition Element)

The aluminum oxide film 2 contains at least one species of an addition element not less than 1.00 in P-B ratio, and the total contained amount of the addition element thereof (an addition element content) is in a range of 0.010 to 5.0 atomic %.

The addition element not less than 1.00 in P-B ratio can suppress formation of the pore on the aluminum oxide film 2 to thereby render a microstructure more compact as with the case of magnesium. For this reason, the oil component can be easily removed in the degreasing process without being taken into the aluminum oxide film 2, thereby securing wettability after degreasing after stored for the long time-period. It has been found that if the addition element is contained such that the addition element content of the aluminum oxide film 2 is not less than 0.010 atomic %, desirable stability in wettability after degreasing can be secured. The addition element content is preferably not less than 0.015 atomic %, more preferably not less than 0.020 atomic %, and most preferably not less than 0.5 atomic %. An upper limit of the addition element content is preferably not more than 5.0 atomic % from a manufacturing point of view, preferably not more than 4.0 atomic %, and more preferably not more than 3.0 atomic %.

Now, P-B ratio (Pilling-Bedworth ratio) is an index expressing a ratio of the molar volume of a metal oxide to the molar volume of a metal, and R can be expressed by the following formula (1), where R: P-B ratio, V oxide: the molar volume of a metal oxide, and V metal: the molar volume of a metal.

Formula 1

$$R = V\text{ oxide}/V\text{ metal} \tag{1}$$

The addition elements not less than 1.00 in P-B ratio includes, for example, Ce(cerium): 1.16, Pb(lead): 1.28, Pt(platinum): 1.56, Zn(zinc): 1.58, Be(beryllium): 1.59, Pd(palladium): 1.60, Hf(hafnium): 1.62, Ni(nickel): 1.65, Cu(copper) 1.68, Fe (in the case of iron/Fe O): 1.7, Ti(titanium): 1.73, Mn(manganese): 1.79, Co(cobalt): 1.99, Cr(chromium): 2.07, Fe (in the case of iron/Fe$_3$O$_4$): 2.1, Fe (in the case of iron/Fe$_2$O$_3$): 2.14, Si(silicon): 2.15, etc. Among those addition elements, Ce(cerium), Zn, Hf, Ni, Cu, Fe, Ti, Mn, Co, and Cr are preferable from the viewpoint of cost and safety.

The addition element less than 1.00 in P-B ratio includes, for example, Li(lithium): 0.57, Na(sodium): 0.57, K(potassium): 0.45, Rb(rubidium): 0.56, Cs(caesium): 0.47, Ca(calcium): 0.64, Mg(magnesium): 0.81, Sr(strontium): 0.65, and Ba(barium): 0.69, etc. Further, metallic elements less than 1 in P-B ratio, excluding Mg, (Li, Na, K, Rb, Cs, Ca, Sr, and Ba), are preferably as few as possible in the number thereof, and if the total contained amount (the addition element content) thereof is less than 0.1 atomic %, the aluminum oxide film 2 that has been rendered more compact through addition of an addition element not less than 1.00 in P-B ratio will not be turned into an oxide film having a pore, so that advantageous effects of the stability in wettability will not be interfered with.

As a method for causing an addition element to be contained in the aluminum oxide film 2, it need only be sufficient to use, for example, a salt of a water-soluble addition element, dissolved in an aqueous solution of a zirconium salt. For an addition element salt, a salt dissoluble in an acidic aqueous solution less than pH 5 will suffice, and, for example, use may be made of a nitrate, a sulfate, and an acetate, etc. In order to adjust the addition element content of the aluminum oxide film 2, the addition element content as desired can be obtained by adjustment of treatment time as well as the temperature of the surface treatment, together with the concentration as well as the pH of the finishing liquid, as described later on.

Further, in the case of the aluminum oxide film 2 containing the predetermined content of zirconium, magnesium, and an addition element, respectively, together with halogen and phosphorus, as impurities, it is preferably found that fluorine: less than 0.1 atomic %, chlorine: less than 0.1 atomic %, bromine: less than 0.1 atomic %, iodine: less than 0.1 atomic %, astatine: less than 0.1 atomic %, and phosphorous: less than 0.1 atomic % at the time of measuring the halogen element and phosphorous. In the case of the aluminum oxide film 2 containing a halogen element not less than 0.1 atomic %, a production unit to cope with the halogen element will come under a load. Further, in the case of the aluminum oxide film 2 containing phosphorous not less than 0.1 atomic %, precipitation is susceptible to occurrence when the finishing liquid is discharged, and an environment is susceptible to pollution.

Further, the aluminum oxide film 2 is made up of the remainder including oxygen and aluminum and impurities such as halogen, phosphorous, etc., besides those elements (zirconium, magnesium, and the addition element not less than 1.00 in P-B ratio). The preferable contained amount of oxygen and aluminum, respectively, is in a range of 15 to 80 atomic %. Further, if an impurity other than halogen and phosphorous is C, the contained amount of C less than 10 atomic % is permissible, if an impurity other than halogen and phosphorous is N, the contained amount of N less than 15% atomic % is permissible, and if impurities other than halogen and phosphorous are other impurities, the contained amount thereof less than 7 atomic % is permissible.

(Film-Thickness)

The aluminum oxide film 2 is preferably in a range of 1 to 30 nm in film-thickness. If the film-thickness is less than 1 nm, adsorption of both a rust-prevention oil used at the time of forming the substrate 1, and an ester component of a press-oil used at the time of forming a joined body (refer to FIGS. 3(*a*) through 3(*d*)), and an automotive member (not shown) from the aluminum-alloy plate 10 will be suppressed. For this reason, although degreasing properties, chemical conversion properties, and adhesion durability of the aluminum-alloy plate 10 are ensured even without the aluminum oxide film 2, excessive acidic cleaning and so forth will be required in order to control the film-thickness of the aluminum oxide film 2 to be kept less than 1 nm, so that productivity is decreased and practical utility is susceptible to deterioration. On the other hand, if the film-thickness of the aluminum oxide film 2 is in excess of 30 nm, microscopic asperities are susceptible to occurrence on the surface thereof due to an excessive film amount, so that uneven chemical conversion is prone to occurrence, and chemical conversion characteristics are prone to deterioration. Further, the film-thickness is more preferably in a range of 10 to 20 nm.

Further, the film-thickness of the aluminum oxide film 2 is largely dependent on a factor decided by an oxide film formed by the heat treatment in the aluminum-oxide-film formation process S2 (refer to FIG. 2), as described later on. In surface treatment using the aqueous solution of the zirconium salt, containing an addition element, as described later on, zirconium dioxide as well as the addition element adheres to, or enters the oxide film, and the magnesium content of the oxide film is controlled, so that the major portion of the film-thickness of the aluminum oxide film 2 is determined by the film-thickness of the oxide film formed by the heat treatment. Furthermore, the film-thickness of the oxide film is controlled by heating temperature and heating time. Further, the oxide film formed by the heat treatment is an irregular and porous film formed on the surface of the substrate 1, containing magnesium oxide as a main component.

(Method of Measuring Respective Element Contents as Well as Film-Thickness of Each Element in the Aluminum Oxide Film,)

Each element content in the aluminum oxide film 2 formed on the surface of the substrate 1 (a zirconium content, a magnesium content, a content of an addition element not less than 1.00 in P-B ratio, a halogen content, a phosphorous content, etc.) is measured by GD-OES (Glow Discharge Optical Emission Spectroscopy), and the maximum measurement value of a given element, obtained upon measurement reaching a depth at which a measurement value of an oxygen content is found not more than 15 atomic %, in a depth-wise profile of the aluminum oxide film 2, is regarded as the maximum value of the element content. Further, GD-OES is capable of measuring the film-thickness of the aluminum oxide film 2 as well. More specifically, the depth at which the measurement value of the oxygen content is not more than 15 atomic %, in the depth-wise profile of the aluminum oxide film 2, can be regarded as the film-thickness of the aluminum oxide film 2. Furthermore, needless to say, the mean value of measurement results at several spots on the surface of the aluminum oxide film 2 can be regarded as each element content and each film-thickness, respectively. Further, the zirconium content can also be found from a zirconium dioxide content of the aluminum oxide film 2. That is, the zirconium dioxide content is first found, and the zirconium content is calculated from the zirconium dioxide content according to a predetermined operation.

A method of measuring an element content and a film-thickness is not limited to GD-OES, in particular, and use may be made of other measuring methods having the same precision as that of GD-OES, such as AES (Auger electron spectroscopy), and XPS (X-ray photoelectron spectroscopy), etc.

An aluminum-alloy plate 10A according to the invention is preferably further equipped with an bonding layer 3 made of a bonding agent, provided on the surface of the aluminum oxide film 2, as shown in FIG. 1(b).

<Bonding Layer>

There is no particular limitation to the bonding agent making up the bonding layer 3, and use can be made of a bonding agent that has been conventionally used at a time when an aluminum-alloy plate is joined, including, for example, thermosetting epoxy resin, acrylic resin, and polyurethane resin. There is no particular limitation to the thickness of the bonding layer 3, however, the thickness of the bonding layer 3 is preferably in a range of 10 to 500 μm, and more preferably in a range of 50 to 400 μm. If the thickness of the bonding layer 3 is less than 10 μm, the aluminum-alloy plate 10A might not be joined at high adhesion-durability to another aluminum-alloy plate 10 (refer to FIG. 1(a)) without an bonding layer equipped therewith through the intermediary of the bonding layer 3. In other words, the adhesion-durability of a joined body 20B of FIG. 3(c), described later on, might be deteriorated. If the thickness of the bonding layer 3 exceeds 500 μm, adhesive strength might be decreased.

<<Production Method of an Aluminum-Alloy Plate>>

Figure 2:
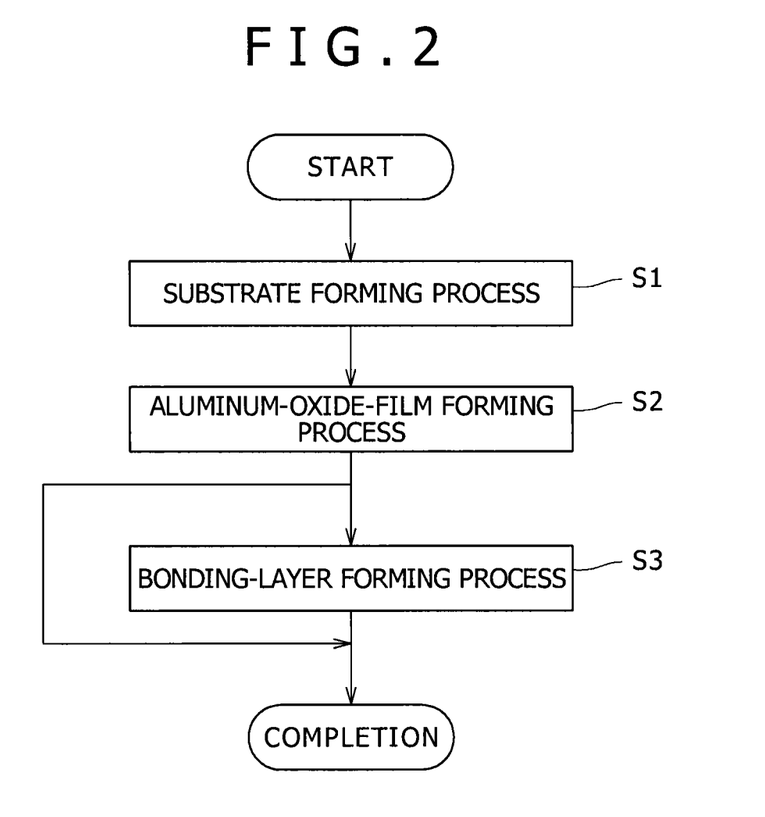
FIG. 2 is a process flow-sheet showing a method for manufacturing the aluminum-alloy plate of FIGS. 1(a) and 1(b), FIGS. 3(a) through 3(d) each are a sectional view schematically showing the makeup of a joined body according to the invention, and FIGS. 4(a) and 1(b) each show the shape of an adhesion-test specimen prepared in carrying out an example of the invention.
Figure 3:
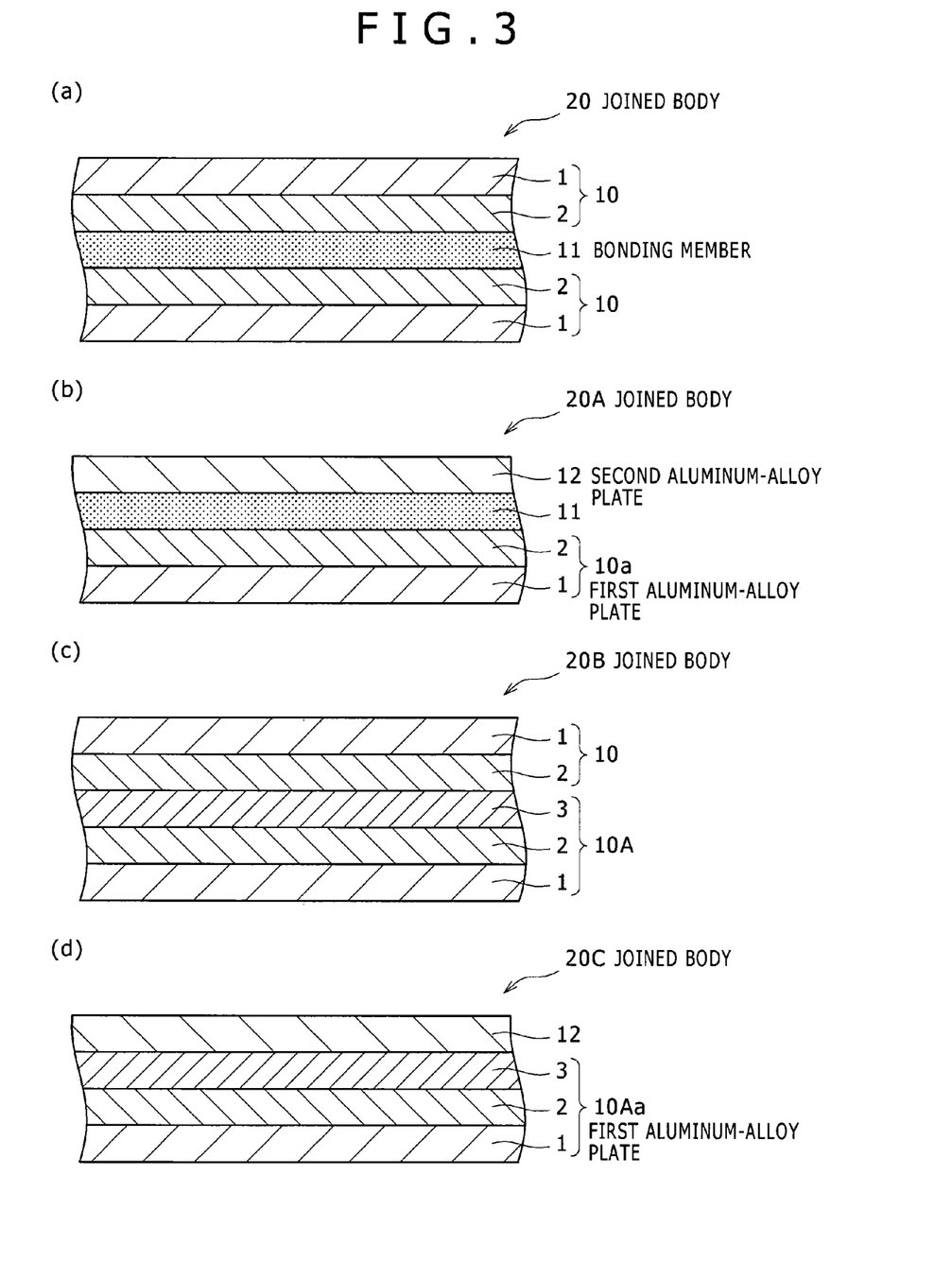

Next, a production method of the aluminum-alloy plate is described with reference to FIG. 2. With respect to the makeup of the aluminum-alloy plate, FIGS. 1(a) and 1(b) each are referred to.

The production method of the aluminum-alloy plate 10 includes a substrate forming process S1 and an aluminum-oxide-film forming process S2. Respective processes are described below.

<Substrate Forming Process>

The substrate forming process S1 is a process for forming the substrate 1 by rolling. To be more specific, the substrate 1 is preferably formed according the following procedure.

An aluminum alloy having a predetermined composition is melted and cast by continuous casting to thereby produce an ingot (a melting and casting process), and a harmonizing heat treatment is applied to the ingot as produced (a harmonizing heat treatment process). Subsequently, hot rolling is applied to the ingot subjected to the harmonizing heat treatment to thereby produce a hot rolled plate (a hot rolling process). Then, rough annealing or process annealing is applied to the hot rolled plate at a temperature in a range of 300 to 580° C., and at least one cold rolling at a final cold rolling reduction ratio not less than 5% is applied to the hot rolled plate to thereby produce a cold rolled plate (the substrate 1) having a predetermined thickness (a cold rolling process). If the temperature for the rough annealing or the process annealing is at 300° C. or higher, the effects of enhancement in formability is more exhibited, and if the temperature therefor is at 580° C. or lower, deterioration in formability due to occurrence of burning, will be suppressed with greater ease. If the final cold rolling reduction ratio is not less than 5%, the effect of enhancement is more exhibited. Further, there is no particular limitation to conditions for the harmonizing heat treatment process, and the hot rolling, and a condition under which the hot rolled plate can be normally obtained will suffice. Furthermore, the process annealing may be omitted.

<Aluminum-Oxide-Film Forming Process>

The aluminum-oxide-film forming process S2 is a process whereby the aluminum oxide film 2 is formed on the surface of the substrate 1 formed in the preceding process S1. Further, the aluminum-oxide-film forming process S2 is a process whereby heat treatment is applied to the substrate 1 to be followed by application of surface treatment to thereby adjust the zirconium content, the magnesium content, and the addition element content, respectively, in the aluminum oxide film 2, to fall in a predetermined range.

(Heat Treatment)

With the heat treatment in the aluminum-oxide-film forming process S2, the substrate 1 is heated to a temperature in a range of 400 to 580° C., and an oxide film making up the aluminum oxide film 2 is formed on the surface of the substrate 1. Further, the heat treatment is for use in adjustment of the strength of the aluminum-alloy plate 10. Herein, for the heat treatment, rapid heating is preferably applied at a heating rate not less than 100° C./min.

In the case where the substrate 1 is made of a heat treatment type aluminum alloy, the heat treatment is a solution heat treatment, whereas, in the case where the substrate 1 is made of a non-heat treatment type aluminum alloy, the heat treatment is a heat treatment in annealing (final annealing).

If the rapid heating to a heating temperature not less than 400° C. is applied, the strength of the aluminum-alloy plate 10, and the strength of the aluminum-alloy plate 10 after post-coating heating (baking) will be rendered higher. If the rapid heating at the heating temperature at 580° C. or lower is applied, deterioration in formability due to occurrence of burning can be suppressed. Further, if heating is applied at a heating temperature in the range of 400 to 580° C., an oxide film 1 to 30 nm in film-thickness, making up the aluminum oxide film 2, is formed on the surface of the substrate. Further, holding time is preferably in a range of 3 to 30 sec from the viewpoint of enhancement in strength.

(Surface Treatment)

With the surface treatment in the aluminum-oxide-film forming process S2, surface treatment is applied to the surface of the substrate 1 with the oxide film formed thereon, and the oxide film formed by the heat treatment, that is, the aluminum oxide film 2 whose oxide film is subjected to the surface treatment is adjusted such that the zirconium content, the magnesium content, and the addition element content each fall in the predetermined range.

For a finishing liquid in the surface treatment, use is made of a finishing liquid containing zirconium in concentration of 0.001 to 1 g/L, and an addition element in concentration of 0.001 to 0.5 g/L, having a pH smaller than 5, and an aqueous solution of a zirconium salt, containing an addition element, is preferably used. Further, in the surface treatment, an acid, such as nitric acid, sulfuric acid, etc., may be added in order to adjust pH. Furthermore, in the surface treatment, a finishing liquid temperature is in a range of 10 to 90° C., and treatment time is in a range of 1 to 200 sec. This finishing liquid also serves as a coolant for cooling the aluminum-alloy plate 10 which has reached a high temperature due to heat treatment.

With this surface treatment, an attempt to apply surface treatment to the substrate 1 is made by, for example, showering and atomizing the substrate 1 with the oxide film formed thereon to thereby spray the aqueous solution of the zirconium salt containing the addition element, thereon, causing the substrate 1 with the oxide film formed thereon to pass through the aqueous solution of the zirconium salt containing the addition element, or causing the substrate 1 with the oxide film formed thereon to be immersed in the aqueous solution of the zirconium salt containing the addition element. Further, as the finishing liquid (the aqueous solution of the zirconium salt, containing the addition element), the halogen content less than 0.1 atomic %, and the phosphorus content less than 0.1 atomic % are preferable.

If a finishing liquid having the zirconium concentration in the range of 0.001 to 1 g/L is used as the finishing liquid, the zirconium content of the aluminum oxide film 2 will be in the range of 0.01 to 10 atomic % and magnesium will be dissolved in the finishing liquid, so that a magnesium content will be not less than 0.1 atomic %, and less than 10 atomic %. If zirconium concentration is less than 0.001 g/L, the zirconium content of the aluminum oxide film 2 will be low (less than 0.01 atomic %), and a magnesium content will be high (not less than 10 atomic %), so that stability in the wettability of the aluminum-alloy plate 10 cannot be secured. On the other hand, if the zirconium concentration is in excess of 1 g/L, the zirconium content of the aluminum oxide film 2 will be high (in excess of 10 atomic %), or the magnesium content will be low (less than 0.1 atomic %), so that the effects of enhancement in stability in the wettability will be saturated. Accordingly, the zirconium concentration is set to a range of 0.001 to 1 g/L.

If a finishing liquid containing an addition element in concentration from 0.001 to 0.5 g/L, preferably in concentration from 0.005 to 0.1 g/L, is used as the finishing liquid, the addition element content of the aluminum oxide film 2 will be in a range of 0.010 to 5.0 atomic %. If an addition-element concentration is less than 0.001 g/L, the addition-element content of the aluminum oxide film 2 will be low (less than 0.010 atomic %), so that the stability in wettability of the aluminum-alloy plate 10 cannot be secured.

On the other hand, if the addition-element concentration is in excess of 0.5 g/L, the addition-element content of the aluminum oxide film 2 will be high (in excess of 5.0 atomic %), which is undesirable from the viewpoint of processability. Accordingly, the addition-element concentration is set to a range of 0.001 to 0.5 g/L.

If the pH of the finishing liquid is 5 or greater, this will cause deterioration in the stability of the finishing liquid, so that precipitation is susceptible to occurrence in the finishing liquid. If precipitation occurs in the finishing liquid, a precipitate as a foreign matter will be forced into the surface of the aluminum-alloy plate 10 to thereby exhibit poor outward appearance, which is undesirable. The pH of the aqueous solution of the zirconium salt serving as the finishing liquid is, therefore, set to smaller than 5.

If the temperature of the finishing liquid is lower than 10° C., or treatment time is shorter than 1 sec, the zirconium content of the aluminum oxide film 2 will be less than 0.01 atomic %, the magnesium content thereof will be not less than 10 atomic %, and the addition element content of the aluminum oxide film 2 will be less than 0.010 atomic %, so that the stability in wettability of the aluminum-alloy plate 10 cannot be secured. On the other hand, if the treatment temperature of the aqueous solution of the zirconium salt exceeds 90° C., or treatment time exceeds 200 sec, the zirconium content of the aluminum oxide film 2 will exceed 10 atomic %, the magnesium content will be less than 0.1 atomic %, and the addition-element content will exceed 5.0 atomic %, whereupon the effects of enhancement in the stability in wettability will be saturated. Accordingly, the treatment temperature of the aqueous solution of the zirconium salt is set to a range of 10 to 90° C., and treatment time is set to a range of 1 to 200 sec.

If the halogen content of the finishing liquid is less than 0.1 atomic %, and the phosphorus content thereof is less than 0.1 atomic %, this means that halogen and phosphorus cannot be measured at the time of making measurement on these elements by GD-OES, etc., in other words, meaning that these elements are below the limit of measurement. Further, the control of the halogen content as well as the phosphorus content in the finishing liquid is executed concurrently with controlling the zirconium content, the magnesium content, and the addition element content, respectively, according to a concentration and a treatment condition.

Further, for the purpose of removal of magnesium from the aluminum oxide film 2 prior to the surface treatment executed in the aqueous solution of the zirconium salt, more specifically, in order to render the magnesium content of the aluminum oxide film 2 to be not less than 0.1 atomic % and less than 10 atomic %, a surface treatment using an acid, such as nitric acid, sulfuric acid, etc., as the finishing liquid, that is, the so-called acid cleaning may be executed. As conditions for the acid cleaning, an acid concentration in a range of 0.5 to 6N, a pH less than 1, a cleaning temperature in a range of 20 to 80° C., and cleaning time in a range of 1 to 100 sec are preferable.

Next, there is described a method for manufacturing the aluminum-alloy plate 10A equipped with the bonding layer 3. The method for manufacturing the aluminum-alloy plate 10A includes the substrate forming process S1, the aluminum-oxide-film forming process S2, and the bonding layer forming process S3. The substrate forming process S1, and the aluminum-oxide-film forming process S2 each are the same as described above, omitting therefore repetition in description.

<Bonding Layer Forming Process>

A bonding layer forming process S3 is a process for forming the bonding layer 3 made up of a bonding agent on the surface of the aluminum oxide film 2 formed in the aluminum-oxide-film forming process S2. Although there is no particular limitation to a method for forming the bonding layer 3, the method includes a method for forming the bonding layer 3 after preparing a solution by dissolving the bonding agent in a solvent if the bonding agent is, for example, a solid, or if the bonding agent is in a liquid state, a method for forming the bonding layer 3 by spraying the bonding agent as it is on the surface of the aluminum oxide film 2 or coating the surface of the aluminum oxide film 2 with the bonding agent as it is.

The production method of the aluminum-alloy plate 10 or the aluminum-alloy plate 10A is as described above, however, upon producing the aluminum-alloy plate 10 or the aluminum-alloy plate 10A, another process may be included in between the respective processes, or added before or after the respective processes to the extent that the respective processes are not adversely affected. For example, a pre-aging treatment process for a pre-aging treatment may be applied after the aluminum-oxide-film forming process S2 or the bonding layer forming process S3. The pre-aging treatment is preferably executed though low-temperature heating applied within 72 hrs, at a temperature in a range of 40 to 120° C. for time in a range of 8 to 36 hrs. Enhancement in formability, and strength after baking can be achieved by applying the pre-aging treatment under this condition.

Besides, a foreign-matter removal process for removing, for example, a foreign matter on the surface of the aluminum-alloy plate 10 or the aluminum-alloy plate 10A, or a defective removal process for removing a defective that has occurred in the respective processes may be included.

Further, the surface of the aluminum-alloy plate 10 or the aluminum-alloy plate 10A, as produced, is coated with a press-oil before formation of a joined body, or an automotive member. A press-oil containing an ester component is mainly used.

Next, there is described a method for applying a press-oil to the aluminum-alloy plate 10 or the aluminum-alloy plate 10A, according to the invention.

As the method for applying the press-oil, it is sufficient to simply immerse the aluminum-alloy plate 10 or the aluminum-alloy plate 10A in, for example, a press-oil containing ethyl oleate as an ester component. There is no particular limitation to a method and a condition, to be adopted in applying the press-oil, but a normal method and condition, adopted in applying a press-oil, can be widely used. The ester component is not limited to ethyl oleate, but a variety of components, such as butyl stearate, and sorbitan monostearate, etc., can be utilized.

<<Joined Body>>

Next, a joined body according to the invention is described. Further, description is given hereunder on the assumption that the aluminum-alloy plates 10, 10A each are equipped with the aluminum oxide film 2 formed on one face thereof (refer to FIGS. 1(a) and 1(b)).

A joined body 20 is provided with two of the aluminum-alloy plates 10, 10, and the bonding member 11, as shown in FIG. 3(a). More specifically, with the joined body 20, the aluminum-alloy plates 10, 10 are joined to each other through the intermediary of the bonding member 11. One plane of the bonding member 11 is bonded to a portion of one of the aluminum-alloy plates, adjacent to the aluminum oxide film 2, and the other plane of the bonding member 11 is bonded to a portion of the other of the aluminum-alloy plates, adjacent to the aluminum oxide film 2. As a result, the respective aluminum oxide films 2, 2 of the two aluminum-alloy plates 10, 10 are disposed so as to oppose each other through the intermediary of the bonding member 11.

<Aluminum-Alloy Plate>

The aluminum-alloy plate 10 is the same as described above, omitting therefore repetition in description.

<Bonding Member>

The bonding member 11 is made of the bonding agent, and is similar to the bonding layer 3 described as above. More specifically, the bonding member 11 is made of the bonding agent such as thermosetting epoxy resin, acrylic resin, and polyurethane resin, etc. Further, although there is no particular limitation to the thickness of the bonding member 11, the thickness thereof is preferably in a range of 10 to 500 μm, and more preferably in a range of 50 to 400 μm.

In the joined body 20, the respective planes of the bonding member 11 are bonded to the aluminum oxide films 2 containing the predetermined amount of zirconium, magnesium, and the addition element, respectively, and having improved stability in wettability, as previously described. Accordingly, deterioration in adhesion strength at an interface between the bonding member 11 and the aluminum oxide film 2 is controlled. For this reason, in the case where the joined body 20 is used for an automotive member, adhesion durability thereof is improved even if exposed to a high temperature and humid environment.

In a joined body 20A, a second aluminum-alloy plate 12 is substituted for one of the two aluminum-alloy plates 10, 10 (refer to FIG. 3(a)) of the joined body 20, as shown in FIG. 3(b). More specifically, the second aluminum-alloy plate 12 made of aluminum alloy is bonded to a first aluminum-alloy plate 10a that is made from the aluminum-alloy plate 10 through the intermediary of the bonding member 11, and the bonding member 11 is bonded to a portion of the first aluminum-alloy plate 10a, adjacent to the aluminum oxide film 2.

As the first aluminum-alloy plate 10a is made from the aluminum-alloy plate 10, and the aluminum-alloy plate 10 is the same as previously described, omitting therefore repeated description thereof.

<Second Aluminum-Alloy Plate>

The second aluminum-alloy plate 12 is the same as the substrate 1 that is previously described. More specifically, the second aluminum-alloy plate 12 is made of an aluminum alloy to be selected from among a variety of non-heat-treatable aluminum alloys, or heat-treatable aluminum alloys, specified by JIS, or closely analogous to JIS.

In the joined body 20A, since the one plane of the bonding member 11 is bonded to the aluminum oxide film 2, deterioration in adhesion strength at the interface between the bonding member 11 and the aluminum oxide film 2 is suppressed as in the case of the joined body 20. For this reason, in the case where the joined body 20A is used for an automotive member, adhesion durability thereof is improved even if exposed to a high temperature and humid environment.

A joined body 20B is provided with the aluminum-alloy plate 10A equipped with the bonding layer 3 (refer to FIG. 1(b)), and the aluminum-alloy plate 10 that is not equipped with the bonding layer 3, as shown in FIG. 3(c). More specifically, the aluminum oxide film 2 of the aluminum-alloy plate 10 is bonded to a portion of the aluminum-alloy plate 10A, adjacent to the bonding layer 3. As a result, the respective aluminum oxide films 2, 2 of the two aluminum-alloy plates 10A, 10 are disposed so as to oppose each other through the intermediary of the bonding layer 3. Further, the aluminum-alloy plates 10A, 10 are the same as previously described, omitting therefore repeated description thereof.

With the joined body 20B, since the respective planes of the bonding layer 3 are bonded to the respective portions of the two aluminum-alloy plates 10A, 10, adjacent to the aluminum oxide film 2, deterioration in adhesion strength at an interface between the bonding layer 3 and each of the aluminum oxide films 2 is suppressed as in the case of the joined body 20. For this reason, in the case where the joined body 20B is used for an automotive member, adhesion durability thereof is improved even if exposed to a high temperature and humid environment.

In a joined body 20C, a second aluminum-alloy plate 12 is substituted for the aluminum-alloy plate 10 of the joined body 20B, which is not equipped with the bonding layer 3, (refer to FIG. 3(c)), as shown in FIG. 3(d). More specifically, the second aluminum-alloy plate 12 made of aluminum alloy is bonded to a first aluminum-alloy plate 10Aa made from the aluminum-alloy plate 10A equipped with the bonding layer 3, and the second aluminum-alloy plate 12 is bonded to a portion of the first aluminum-alloy plate 10Aa, adjacent to the bonding layer 3. Further, the first aluminum-alloy plate 10Aa is made from the aluminum-alloy plate 10A, and the aluminum-alloy plate 10A is the same as previously described, omitting therefore repeated description thereof. Furthermore, the second aluminum-alloy plate 12 is the same as described as above, omitting therefore repeated description thereof.

In the joined body 20C, since the one surface of the bonding layer 3 is bonded to the side of the aluminum oxide film 2 (a portion of the first aluminum-alloy plate 10Aa, adjacent to the aluminum oxide film 2), deterioration in adhesion strength at the interface between the bonding layer 3 and the aluminum oxide film 2 is suppressed. For this reason, in the case where the joined body 20C is used for an automotive member, adhesion durability thereof is improved even if exposed to a high temperature and humid environment.

For a method of manufacturing the joined bodies 20, 20A through 20C, more specifically, for a joining method, use is made of the previously known bonding method. Further, although there is no particular limitation to a method of forming the bonding member 11, for example, use may be made of a bonding member 11 prepared beforehand with the use of a bonding agent, or a bonding member 11 may be formed by spraying a bonding agent on the surface of the aluminum oxide film 2, or by coating the surface of the aluminum oxide film 2 with a bonding agent. Further, a press-oil may be applied to the surface of the joined bodies 20, 20A through 20C, respectively, before formation thereof, into an automotive member, as in the case of the aluminum-alloy plates 10, 10A.

If the aluminum-alloy plates 10, 10A (the first aluminum-alloy plates 10a, 10Aa), each being equipped with the aluminum oxide film 2 formed on the respective surfaces thereof (not shown) are used in the joined bodies 20, 20A through 20C, respectively, the aluminum-alloy plates 10, 10A (the first aluminum-alloy plates 10a, 10Aa), or the second aluminum-alloy plate 12 can be further bonded to the former through the intermediary of the bonding member 11 or the bonding layer 3.

<<Automotive Member>>

Next, an automotive member according to the invention is described below. The automotive member (not shown) is manufactured from the joined bodies 20, 20A through 20C, respectively. The automotive member includes, for example, an automotive panel. There is no particular limitation to a method of manufacturing the automotive member, and the previously known manufacturing method is adopted. For example, processes for cutting, pressing, and so forth are applied to the joined bodies 20, 20A through 20C, respectively, to thereby manufacture an automotive member in a predetermined shape.

Since the automotive member is manufactured from the joined bodies 20, 20A through 20C, respectively, adhesion durability thereof is improved even if exposed to a high temperature and humid environment.

EXAMPLES

Next, an example of an aluminum-alloy plate according to the invention, satisfying requirements of the invention, is specifically described in contradistinction from a comparative example of an aluminum-alloy plate, failing to satisfy the requirements of the invention.

An aluminum alloy cold-rolled sheet (film thickness: 1 mm) was produced from 6000 series aluminum alloy according to 6022 provision (Mg: 0.55 mass %, Si: 0.95 mass %) of JIS standards by use of the production method previously described. The 0.2% yield strength of this cold-rolled sheet was at 230 MPa. The cold-rolled sheet was cut to a size of 150 mm L×70 mm W to prepare a substrate. The substrate was subjected to alkaline degreasing, and a heat treatment was applied thereto up to 550° C. of a real achieving temperature, spraying the following finishing liquid on one surface so that a finishing liquid temperature falls in a range of 10 to 80° C., and treatment time is in a range of 2 to 20 sec before cooled. Then, there was formed an aluminum-alloy plate provided with an aluminum oxide film on the one surface of the substrate, the aluminum oxide film having a controlled content of zirconium, magnesium, and an addition element, respectively, and the aluminum-alloy plate was used for preparing samples (Nos. 1 to 19).

As the finishing liquid, city water was used for a sample (No. 1), and nitric acid having a pH 3 was used for a sample (No. 2). For a sample (No. 3), use was made of an aqueous solution containing 0.05 to 0.5 g/L of zirconium nitrate with a pH adjusted to less than 4 by addition of nitric acid. For samples (Nos. 4 to 19), use was made of an aqueous solution containing 0.001 to 0.5 g/L of an addition element with a pH adjusted to less than 4 by addition of nitric acid, shown in Table 1, and 0.05 to 0.5 g/L of zirconium nitrate.

With respect to the samples (No. 1 to 19), the respective contained amounts of various elements, such as zirconium (Zr), magnesium(Mg), the addition element, halogen and phosphorus, included in the aluminum oxide film, together with a film thickness, were measured with the use of a high-frequency Glow Radio Frequency Glow Discharge Spectrometer (GD-OES (JY-5000RF type), manufactured by HORIBA Jobin Yvon GmbH). Measurement results are shown in Table 1.

With respect to all the samples (No. 1 to 19), halogen and phosphorus were not detected in the aluminum oxide film, and the respective samples were found to contain elements such as O, and Al, together with a trace of impurities, as the remainder, besides Mg, Zr, and the addition element. Further, the film thickness of the aluminum oxide film was found 25 nm or less. Furthermore, with respect to the addition element, "–" shown in Table 1 indicates "not detected".

Next, the following evaluation on the samples (Nos. 1 to 19) was conducted, and results of the evaluation are shown in Table 1.

<Stability in Wettability (Stability in Wettability after Degreasing after Stored in a Humid Environment for a Long Time-Period>

The respective samples (Nos. 1 to 19) prepared to 150 mm L×70 mm W in size were immersed in a press-oil. Subsequently, the following test was conducted in order to examine aged stability of the surface of a test piece coated with the press-oil. The test piece that was left in such a state as coated with the press-oil was left out inside a chamber in an environment of 50 to 90% RH at a temperature in a range of 15 to 35° C. for a period of 9 months. Then, measurement was made on a water-stained area ratio against a test piece area (the better the area ratio is, the higher will be a numerical value) when the test piece was immersed in (1) an automotive weak alkali degreasing-liquid available in the market, immediately after the initial make-up of an electrolytic bath (a degreasing-liquid after the initial make-up of an electrolytic bath), and (2) a degreasing-liquid (degraded degreasing-liquid) obtained by subjecting the automotive weak alkali degreasing-liquid available in the market to the initial make-up of an electrolytic bath, with a pH lowered by 1.5 with the use of sodium hydrogen carbonate, as compared with a pH immediately after the initial make-up of an electrolytic bath, respectively, at a temperature 40° C. for 2 min after the elapse of 9 months. By so doing, the wettability of the aluminum-alloy plate shown in FIG. 1(a), at the time of the chemical conversion, (the stability in wettability, after degreasing) can be evaluated.

According to the criterion for evaluation as adopted, the water-stained area ratio less than 40% is expressed as considerably poor "××", in a range of 40 to less than 60% as poor "×", in a range of 60 to less than 80% as somewhat poor "Δ", in a range of 80 to less than 90% as good "○", and 90% or higher as appreciably good "⊚".

<Cohesion Failure Ratio (Adhesion Durability)>

Figure 4:
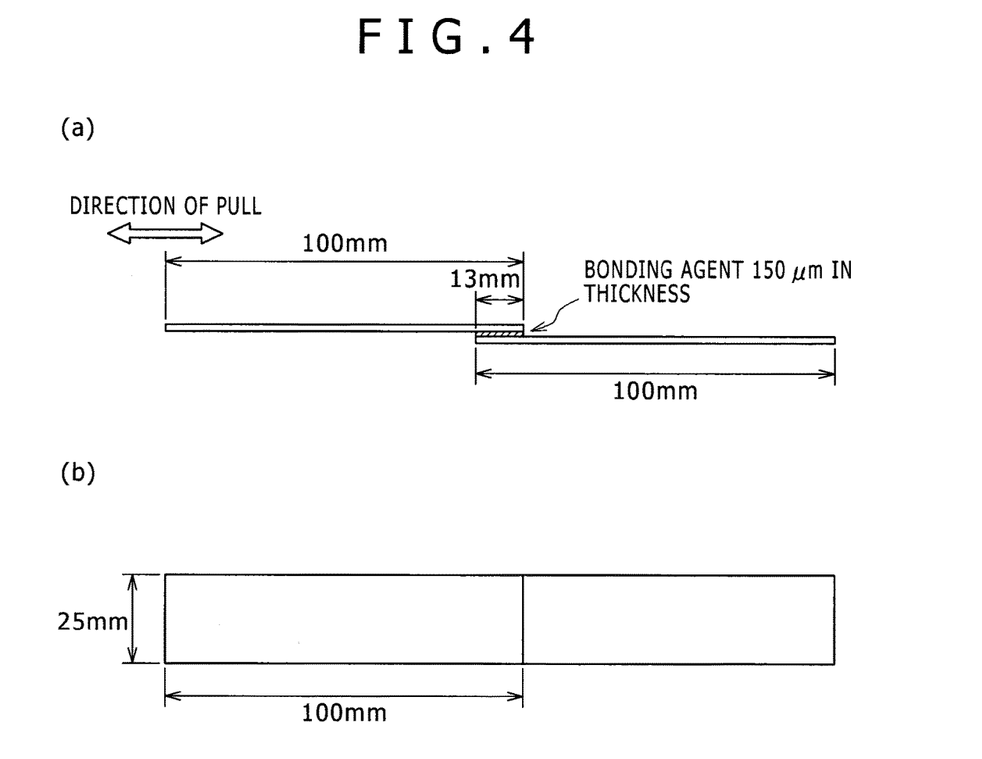

One of respective ends of two sheets of the samples (size: 100 mm L×25 mm W) having the same makeup was overlaid on another to stick thereto with the use of a thermosetting epoxy-resin based bonding agent so that aluminum oxide films thereof oppose each other via the binding agent, while having a lap length of 13 mm (an adhesion area: 25 mm×13 mm), as shown in FIGS. 4(a) and 4(b). The bonding agent used in this case was the thermosetting epoxy-resin based bonding agent (bisphenol A epoxy-resin content in a range of 40 to 50%). Further, adjustment was made by adding a trace of glass beads (grain size: 150 μm) to the bonding agent in order that a bonding layer was 150 μm in film-thickness. The samples were dried at room temperature for 30 min after overlapped to be subsequently heated at 170° C. for 20 min, thereby having executed a thermal hardening process. Thereafter, the samples were left at rest for 24 hrs at room temperature, thereby having prepared an adhesion test-piece.

The adhesion test-piece as prepared was held a high-temperature and humid environment at 50° C. and relative humidity 95% for 10 days to be subsequently pulled at a rate of 50 mm/min by use of a tensile tester, thereby having evaluated a cohesion failure ratio of the bonding agent at a bonded part. The cohesion failure ratio was found by formula (2), as shown below. In formula (2), one piece on one side of the adhesion test-piece, after pulled, is a test-piece A, and the other piece is a test-piece B. By so doing, the adhesion durability of the joined body shown in FIG. 3(a) can be evaluated.

Formula 2 cohesion failure ratio (%)=100−{(test-piece $A$ interfacial peeling area/test-piece $A$ adhesion area)×100}+{(test-piece $B$ interfacial peeling area/test-piece $B$ adhesion area)×100}    (2)

Further, three lengths of the test-pieces were prepared under each test-condition, and the mean value of the cohesion failure ratios for the three lengths was adopted as the cohesion failure ratio of the sample. Further, according to the criterion for evaluation as adopted, the cohesion failure ratio less than 60% is expressed as poor "×", in a range of 60 to less than 80% as somewhat poor "Δ", in a range of 80 to less than 90% as good "○", and 90% or higher as excellent "◎".

TABLE 1

| Sample No. | | Composition of aluminum oxide film (atomic %) | | | Stability in wettability | | Adhesion durability After wetting for 10 days |
|---|---|---|---|---|---|---|---|
| | | Zr | Mg | Addition element | Degreasing-liquid after initial make-up of electrolytic bath | Degraded degreasing-liquid | |
| Comparative example | 1 | 0.003 | 13 | — | XX | XX | X |
| | 2 | 0.002 | 7.3 | — | Δ | X | Δ |
| | 3 | 0.50 | 8.2 | — | ○ | Δ | ○ |
| | 4 | 0.43 | 8.6 | Ca: 0.21 | ○ | Δ | ○ |
| | 5 | 0.23 | 8.4 | Cu: 0.005 | ○ | Δ | ○ |
| | 6 | 0.59 | 7.6 | Cu: 6.2 | Δ | X | Δ |
| Example | 7 | 0.85 | 9.1 | Cu: 0.041 | ◎ | ○ | ○ |
| | 8 | 4.2 | 8.3 | Ce: 0.12 | ◎ | ◎ | ◎ |
| | 9 | 2.5 | 8.6 | Ti: 0.43 | ◎ | ◎ | ◎ |
| | 10 | 2.3 | 4.8 | Ti: 2.3 | ◎ | ◎ | ◎ |
| | 11 | 1.5 | 7.2 | Cr: 0.11 | ◎ | ◎ | ◎ |
| | 12 | 3.8 | 7.2 | Cr: 4.3 | ◎ | ◎ | ◎ |
| | 13 | 1.3 | 8.2 | Mn: 0.13 | ◎ | ◎ | ◎ |
| | 14 | 1.2 | 7.6 | Fe: 0.13 | ◎ | ◎ | ◎ |
| | 15 | 0.70 | 4.4 | Co: 0.23 | ◎ | ◎ | ◎ |
| | 16 | 2.1 | 6.1 | Co: 1.3 | ◎ | ◎ | ◎ |
| | 17 | 2.3 | 7.6 | Co: 0.53, Mn: 0.38 | ◎ | ◎ | ◎ |
| | 18 | 0.93 | 7.2 | Ni: 0.021 | ◎ | ◎ | ◎ |
| | 19 | 0.53 | 5.9 | Zn: 0.10 | ◎ | ○ | ◎ |

<Evaluation on Stability in Wettability (Stability in Wettability after Degreasing, after Stored in a High-Temperature and Humid Environment for a Long Time-Period)>

Comparative examples (sample Nos. 1 to 2) each were found poor in respect of stability in wettability in both the degreasing-liquid after the initial make-up of an electrolytic bath and the degraded degreasing-liquid, as shown in Table 1, because these samples were cooled in water or nitric acid. A comparative example (sample No. 3) was found poor in respect of stability in wettability in the degraded degreasing-liquid because an addition element was not contained in the aluminum oxide film.

A comparative example (sample No. 4, corresponding to Patent Document 8) was found poor in respect of stability in wettability in the degraded degreasing-liquid because the P-B ratio of an addition element contained in the aluminum oxide film was less than 1. A comparative example (sample No. 5, corresponding to Patent Document 8) was found poor in respect of stability in wettability in the degraded degreasing-liquid because the content of an addition element in the aluminum oxide film was less than the lower limit value. A comparative example (sample No. 6) was found poor in respect of stability in wettability in both the degreasing-liquid after the initial make-up of an electrolytic bath and the degraded degreasing-liquid because the content of an addition element in the aluminum oxide film was in excess of the upper limit value.

On the other hand, respective examples (sample Nos. 7 to 19) containing a suitable amount of an addition element not less than 1 in P-B ratio, in addition to Zr, and Mg, were found good in respect of stability in wettability in both the degreasing-liquid after the initial make-up of an electrolytic bath and the degraded degreasing-liquid.

<Evaluation of the Cohesion Failure Ratio (Adhesion Durability)>

Since the comparative examples (sample Nos. 1 to 2) each were found as poor, or somewhat poor in respect of adhesion durability after exposure to a high-temperature and humid environment, as shown in Table 1, because these samples were cooled in water or nitric acid. Further, each of the comparative examples (sample Nos. 3 to 5) obtained by controlling only a Zr content and an Mg content was found as good in respect of adhesion durability. Still further, the comparative example (sample No. 6) that is high in the content of an addition element was found as somewhat poor in respect of adhesion durability.

On the other hand, the respective examples (sample Nos. 7 to 19) containing a suitable amount of an addition element not less than 1 in P-B ratio, in addition to Zr, and Mg, have shown results that the adhesion durability thereof was found as good or excellent.

While the aluminum-alloy plate according to the invention, and the joined body as well as the automotive member, using the same, are described in detail as above by showing the preferred form of the invention and the examples thereof, it is to be understood that the invention be not limited thereto and that the scope of the rights of the invention be interpreted on the basis of the description of the appended claims. Further, changes and variations can be obviously made in the invention without departing from the spirit or scope of the following claims.

LIST OF REFERENCE SIGNS

1: aluminum-alloy substrate (substrate),
2: aluminum oxide film
3: bonding layer
10, 10A: aluminum-alloy plate
10a, 10Aa: first aluminum-alloy plate
11: bonding member
12: second aluminum-alloy
20, 20A, 20B, 20C: joined body

The invention claimed is:
1. An aluminum-alloy plate, comprising:
an aluminum-alloy substrate; and
an aluminum oxide film formed on a surface of the aluminum-alloy substrate and comprising
zirconium of from 0.01 to 10 atomic %,
magnesium of from 0.1 to less than 10 atomic %, and
at least one additional element having a Pilling-Bedworth ratio of not less than 1.00 in a total amount of from 0.53 to 5.0 atomic %.
2. The aluminum-alloy plate according to claim further comprising:
a bonding layer made of a bonding agent, formed on a surface of the aluminum oxide film.
3. The aluminum-alloy plate according to claim 1, wherein the aluminum-alloy substrate is made of Al—Mg based alloy, Al—Cu—Mg based alloy, Al—Mg—Si based alloy, or Al—Zn—Mg based alloy.
4. A joined body, comprising:
at least two aluminum-alloy plates according to claim 1, wherein
the aluminum-alloy plates are joined to each other through an intermediary of a bonding member made of a bonding agent,
the bonding member is bonded to respective portions of two of the aluminum-alloy plates, adjacent to the aluminum oxide film, and
respective aluminum oxide films of two of the aluminum-alloy plates are disposed so as to oppose each other through the intermediary of the bonding member.
5. A joined body, comprising:
a first aluminum-alloy plate made from the aluminum-alloy plate according to claim 1; and
a second aluminum-alloy plate made of aluminum alloy and joined to the first aluminum-alloy plate through an intermediary of a bonding member made of a bonding agent,
wherein the bonding member is bonded to a portion of the first aluminum-alloy plate, adjacent to the aluminum oxide film.
6. A joined body, comprising:
a first aluminum-alloy plate, which is the aluminium-alloy plate according to claim 1; and
a second aluminum-alloy plate, which comprises a second aluminum-alloy substrate, a second aluminum oxide film formed on a surface of the second aluminum-alloy substrate, and a bonding layer made of a bonding agent and formed on a surface of the second aluminum oxide film,
wherein
the second aluminum oxide film comprises zirconium of from 0.01 to 10 atomic %, magnesium of from 0.1 to less than 10 atomic %, and at least one additional element having a Pilling-Bedworth ratio of not less than 1.00 in a total amount of from 0.01 to 5.0 atomic %,
the first aluminum-alloy plate is joined to a portion of the second aluminum-alloy plate, adjacent to the bonding layer, and
respective aluminum oxide films of the first and second aluminum-alloy plates are disposed so as to oppose each other through an intermediary of the bonding layer.
7. A joined body, comprising:
a first aluminum-alloy plate made from the aluminum-alloy plate according to claim 2; and
a second aluminum-alloy plate made of an aluminum alloy,
wherein the second aluminum-alloy plate is bonded to a portion of first aluminum-alloy plate, adjacent to the bonding layer.
8. An automotive member manufactured from the joined body according to claim 4.
9. An automotive member manufactured from the joined body according to claim 7.
10. The aluminum-alloy plate according to claim 1, wherein the aluminum oxide film further comprises an element having a Pilling-Bedworth ratio of less than 1.00 in a total amount of less than 0.1 atomic %.
11. The aluminum-alloy plate according to claim 1, wherein the aluminum oxide film has a thickness of from 1 to 30 nm.
12. The joined body according to claim 6, wherein the second aluminum oxide film comprises the at least one additional element having the Pilling-Bedworth ratio of not less than 1.00 in a total amount of from 0.5 to 5.0 atomic %.

* * * * *